US006731720B2

(12) United States Patent
Matsuura

(10) Patent No.: US 6,731,720 B2
(45) Date of Patent: May 4, 2004

(54) IMAGE PICKUP DEVICE

(75) Inventor: Makoto Matsuura, Kanagawa (JP)

(73) Assignee: Canon Kabushiki Kaisha, Tokyo (JP)

(*) Notice: Subject to any disclaimer, the term of this patent is extended or adjusted under 35 U.S.C. 154(b) by 132 days.

(21) Appl. No.: 10/142,899

(22) Filed: May 13, 2002

(65) Prior Publication Data
US 2002/0191742 A1 Dec. 19, 2002

(30) Foreign Application Priority Data
May 16, 2001 (JP) ........................................ 2001-146990

(51) Int. Cl.$^7$ ................................................. A61B 6/14
(52) U.S. Cl. ................... 378/98.8; 378/19; 250/370.11; 250/370.09
(58) Field of Search ............. 378/98.8, 19; 250/370.11, 250/370.09; 348/294

(56) References Cited

U.S. PATENT DOCUMENTS 5,519,751 A   5/1996   Yamamoto et al. ........ 378/98.8

FOREIGN PATENT DOCUMENTS

JP   6-125887   5/1994

Primary Examiner—Craig E Church
(74) Attorney, Agent, or Firm—Fitzpatrick, Cella, Harper & Scinto

(57) ABSTRACT

An image pickup device is provided that comprises: a photoelectric conversion region; a driving circuit for reading out a signal generated by photoelectric conversion from an identical pixel contained in the photoelectric conversion region for a plurality of times; and a correction circuit for extracting a noise component by calculating a difference among a plurality of signals read out by the driving circuit and removing the noise component contained in the signals from the pixel using the extracted noise component.

9 Claims, 7 Drawing Sheets

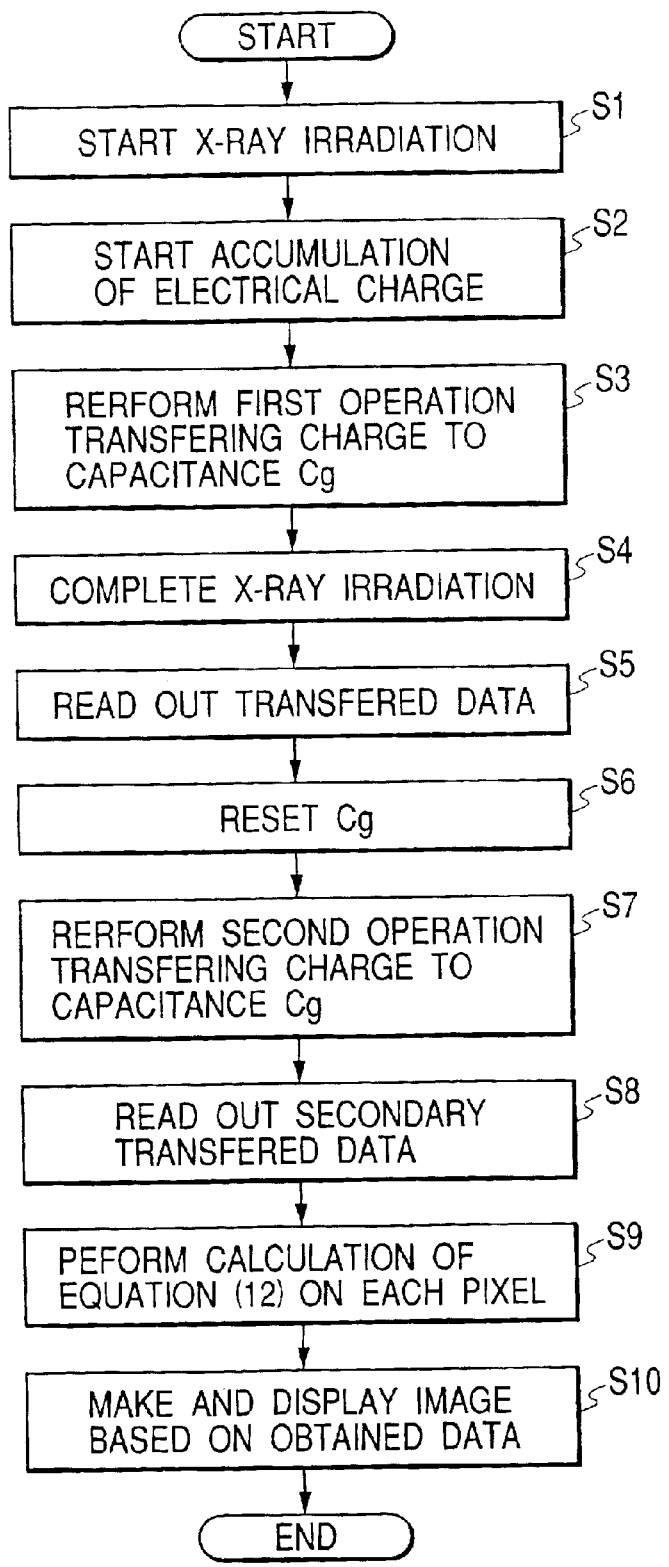

IMAGE PICKUP DEVICE

BACKGROUND OF THE INVENTION

1. Field of the Invention

The present invention relates to an image pickup device and a radiation image pickup or radiographic device for picking up an object image.

2. Related Background Art

As one of radiation image pickup or radiographic devices, there is known an X-ray image pickup device that is utilized in sites of medical care and the like. There were many X-ray image pickup devices that employ a system for converting X-rays to visible light and recording the visible light on a photosensitive film in the past. In recent years, an X-ray image pickup device has been increasingly used, which employs a system for further converting an image of X-rays converted to visible light to an electric image signal, and then displaying the image by a display device.

In general, such an X-ray image pickup device is provided with: a phosphor for converting X-rays to visible light; a solid-state image pickup element as a sensor for detecting the converted visible light; and a light guiding member such as an optical fiber, which guides the converted visible light to the solid-state image pickup element.

In such a sensor, X-rays may be transmitted through the phosphor to be irradiated on the solid-state image pickup element. In this case, a noise signal generated by the incident X-rays directly entered is superimposed on an image signal by visible light. Such an image is very ugly and decreases a sense of resolution.

Thus, in order to reduce X-rays to be this noise as much as possible, measures are taken such as one for using an optical fiber containing an X-ray absorbing material such as lead.

In particular, since a compact and thin X-ray sensor such as an intraoral sensor for dental use which is used in a limited space in a mouth of a patient has a limited thickness, a thickness of the optical fiber used in the X-ray sensor is also limited. Consequently, it may not be possible to completely absorb X-rays transmitted through a phosphor to reach a solid-state image pickup element.

In order to cope with this problem, in a Japanese Patent Application Laid-open No. 6-125887, a device capable of removing an X-ray noise that is transmitted through a phosphor to reach a solid-state image pickup element is proposed. The device disclosed in Japanese Patent Application Laid-open No. 6-125887 compares data obtained from a pixel of a certain point on the solid-state image pickup element with data of neighboring pixels within a fixed range, and if a result of the comparison is equal to or more than a predetermined value, determines that the data obtained from the pixel is data containing a noise due to X-rays to correct the data by deleting and recreating it based on the data of the neighboring pixels. The processing is performed for each point on the solid-state image pickup element.

As described above, the method described in Japanese Patent Application Laid-open No. 6-125887 is for detecting and deleting data of a pixel in which a noise due to X-rays is generated and replacing the data of the pixel with correction data that is newly created based on the data of neighboring pixels.

Therefore, in some cases, deleted data could not be accurately reproduced due to the generation of an X-ray noise (hereinafter referred to as spike noise). In addition, since it was determined whether data of each pixel contains only an original signal or the original signal additionally including a spike noise using data of neighboring pixels, the processing was complicated. Further, if the data of the pixel contained a spike noise, since new data was created based on the neighboring pixels to correct the data as described above, the processing required a large arithmetic operation volume.

SUMMARY OF THE INVENTION

The present invention has been devised in view of the above-mentioned drawbacks, and it is an object of the present invention to obtain image data with few noise components.

In order to achieve the above-mentioned object, according to an embodiment of the present invention, there is provided an image pickup device characterized by comprising: a photoelectric conversion region; a driving circuit for reading out a signal generated by photoelectric conversion from an identical pixel contained in the photoelectric conversion region for a plurality of times; and a correction circuit for extracting a noise component by calculating a difference among a plurality of signals read out by the driving circuit and removing the noise component contained in the signals from the pixel using the extracted noise component.

Also, according to another embodiment of the present invention, there is provided an image pickup device characterized by comprising: a converting member for converting radiation transmitted through an object to light; a photoelectric conversion region for converting the light converted by the converting member to an electric signal; and a correction circuit for extracting a noise component generated by the radiation transmitted through the converting member to reach the photoelectric conversion region from a signal outputted by a first pixel contained in the photoelectric conversion region to remove the noise component contained in the signal from the first pixel using the extracted noise component.

BRIEF DESCRIPTION OF THE DRAWINGS

In the accompanying drawings:

FIG. 7 is a flow chart for describing an example of processing of the present invention.

DESCRIPTION OF THE PREFERRED EMBODIMENT

An embodiment of the present invention will be hereinafter described with reference to the accompanying drawings. In this embodiment, description will be made of a case in which a CMOS solid-state image pickup element is used, which can be driven by low power consumption, and has an element for performing photoelectric conversion and an element for driving it in its vicinity which are formed in an identical circuit. Although X-rays are used as radiation in this embodiment, alpha rays, beta rays, gamma rays and the like can be used as well.

Figure 1:
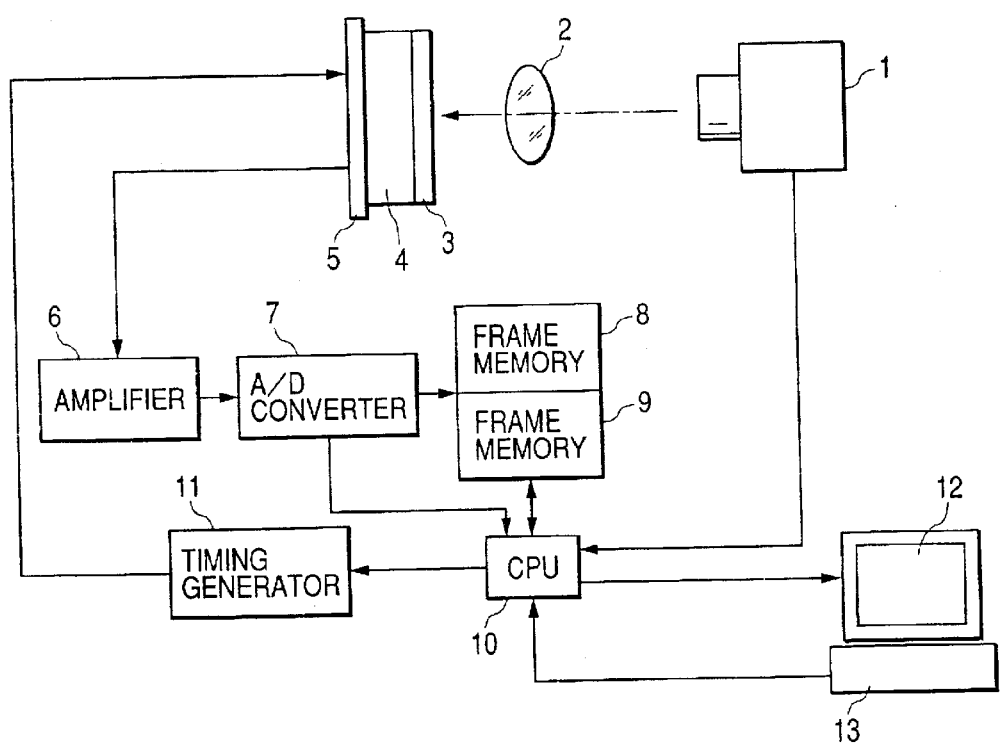
FIG. 1 is a block diagram of an embodiment of the present invention.

FIG. 1 is a block diagram showing the embodiment of the present invention. In this embodiment, an X-ray image pickup device for dental use will be described as an example. Reference numeral 1 denotes an X-ray generator for irradiating X-rays on an object 2, and at the same time, sending a signal indicating the start of X-ray irradiation and information of X-ray irradiation time for one image pickup that are set in advance to a CPU 10. Reference numeral 2 denotes an object, and 3, 4 and 5 denote X-ray sensor units for creating an electric image-signal based on X-rays transmitted through the object 2.

The X-ray sensor unit is constructed of: a phosphor 3 functioning as converting member for converting X-rays transmitted through the object 2 to light; an optical fiber bundle 4 for guiding the light converted from the X-rays by the phosphor 3 to a solid-state image pickup element 5; and a solid-state image pickup element 5 functioning as photoelectric converting member in which a plurality of pixels for converting the light guided by the optical fiber bundle 4 to an electric image signal are arranged. The optical fiber bundle 4 is arranged in a direction perpendicular to the solid-state image pickup element 5 and also plays a role of absorbing X-rays transmitted through the phosphor 3 to significantly attenuate the X-rays.

Reference numeral 6 denotes an amplifier for amplifying an electric image signal created in the X-ray sensor unit to a signal amplitude that is optimal when the signal is processed in an A/D converter 7 and adding an offset correction signal to the signal, 7 denotes an A/D converter for performing A/D conversion of an image signal processed by the amplifier 6, 8 and 9 denote frame memories for accumulating the A/D converted image signal, 10 denotes a CPU for controlling the entire device, 11 denotes a timing generator for generating timing for driving the solid-state image pickup element 5, 12 denotes a display unit for displaying an image signal to which arithmetic processing is applied, and 13 denotes a keyboard for transmitting an instruction from an operator to the device such as trigger for starting measurement.

When X-rays are irradiated on the object 2 by the X-ray image pickup device having the above-mentioned elements, a difference of transmittance among the X-rays transmitted through the object 2 is displayed as shading of an image on the display unit 12.

In addition, image data of two screens required for arithmetic operation discussed below is accumulated in the frame memories 8 and 9. The CPU 11 includes correcting means for performing arithmetic operations using the data in the frame memories 8 and 9. The display unit 12 displays an image signal to which the arithmetic processing is applied.

Figure 2:
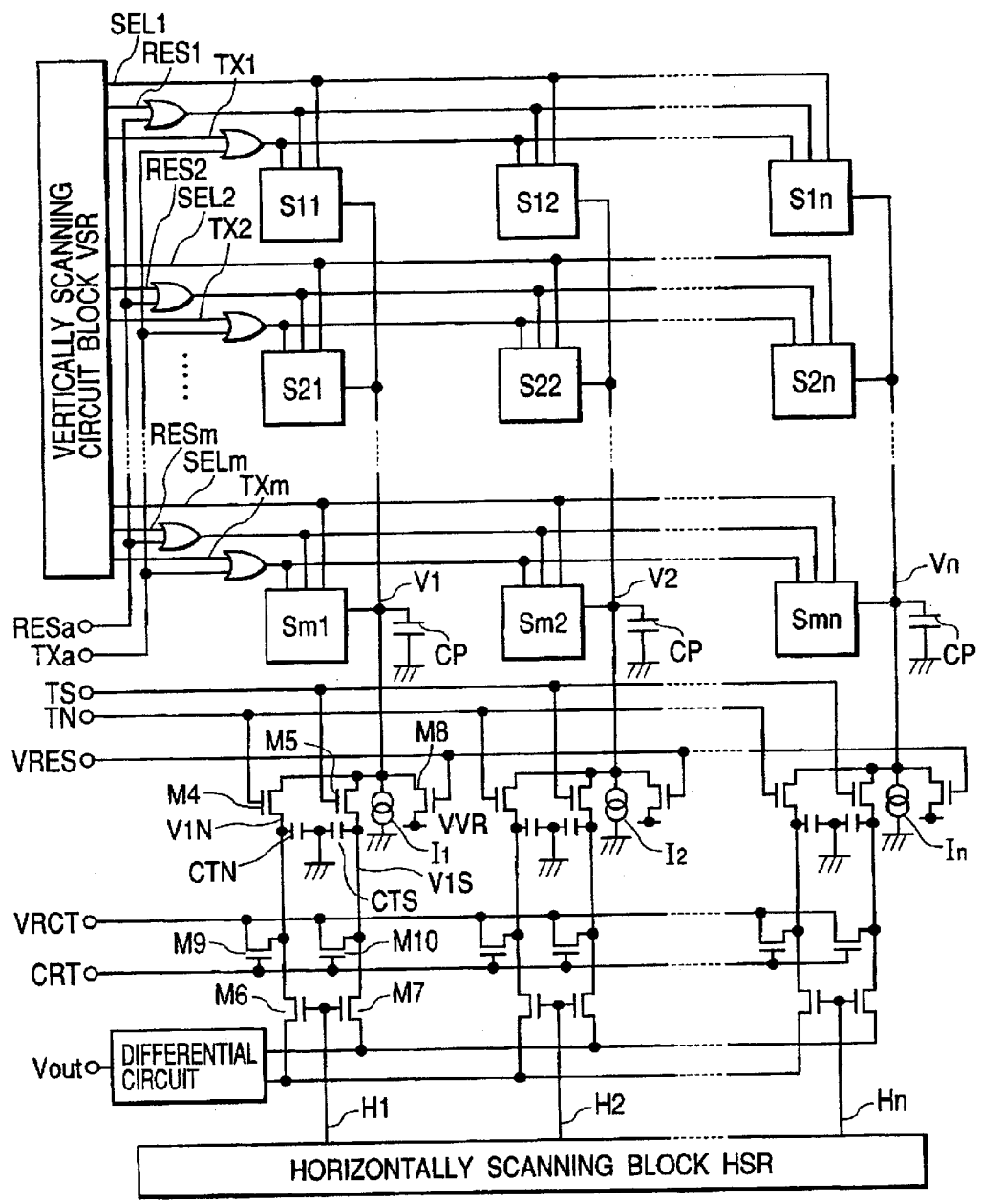
FIG. 2 is a block diagram showing a configuration of a solid-state image pickup element 5.
Figure 3:
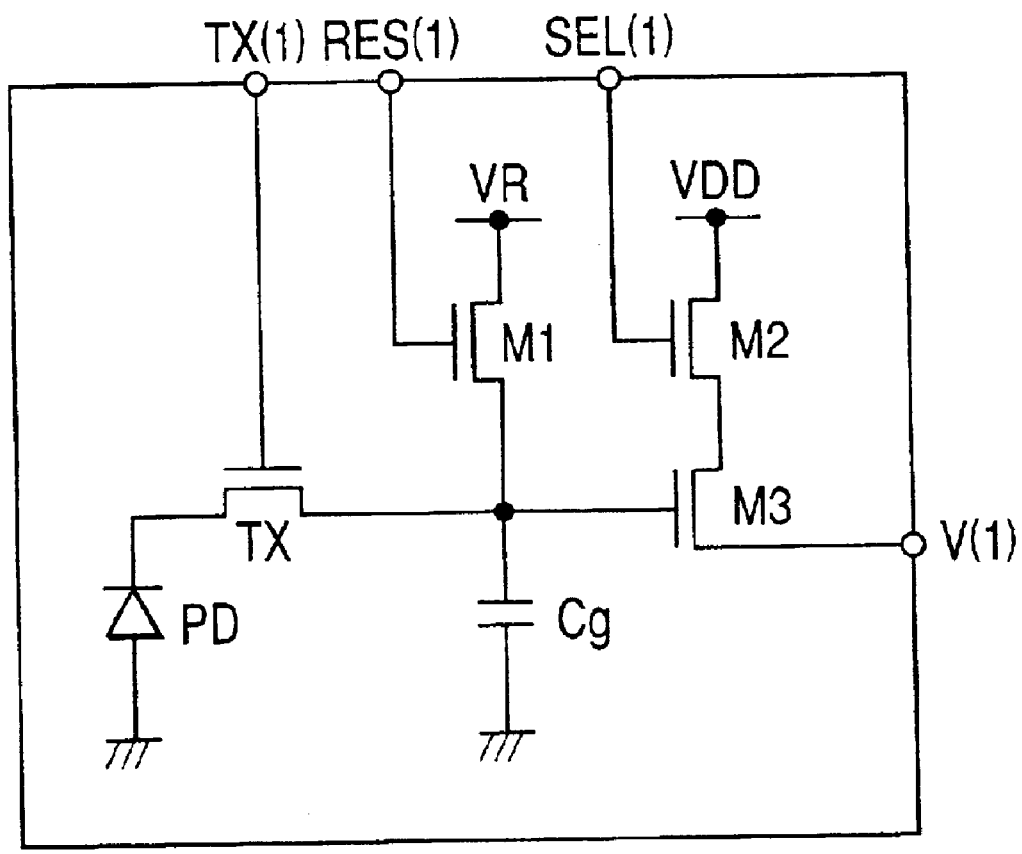
FIG. 3 is a block diagram showing a configuration of one pixel in the solid-state image pickup element 5.

FIG. 2 is a block diagram showing a configuration of the solid-state image pickup element 5. In this embodiment, a CMOS solid-state image pickup element is used in which an element for performing photoelectric conversion and a driving element in its vicinity are integrated in an identical circuit. In addition, FIG. 3 shows a configuration of one pixel of the solid-state image pickup element 5. In the solid-state image pickup element 5 of this embodiment, pixels are arranged in a matrix shape of m rows×n columns. In FIG. 2, reference symbols $S_{11}$ to $S_{mn}$ represent respective pixels.

First, a configuration of one pixel will be described. In FIG. 3, a photodiode PD for converting incident light to electric signals and accumulating them is grounded on its anode side. A cathode side of the photodiode PD is connected to a gate of an amplification MOS M3 via a source and drain of an intra-pixel transfer MOS TX. A source of a reset MOS M1 for resetting the gate of the amplification MOS M3 is also connected to the gate of the amplification MOS M3. A reset voltage VR is applied to a drain of the reset MOS M1.

Moreover, the drain of the amplification MOS M3 is connected to a row selection MOS M2 for supplying an operation voltage VDD. A gate of the transfer MOS TX, a gate of the reset MOS M1 and a gate of the row selection MOS M2 are connected to a row transfer line, a row reset line and a row selection line, respectively.

The configuration of the solid-state image pickup element 5 will be described with reference to FIG. 2. A gate of an electric charge transfer switches TX of each pixel $S_{11}$ to $S_{mn}$ is connected to row transfer lines $TX_1$ to $TX_m$ that are extended in the horizontal direction to be disposed, respectively. In addition, a gate of the reset MOS M1 of each pixel is connected to row reset lines $RES_1$ to $RES_m$ that are extended in the horizontal direction to be disposed, respectively.

Moreover, a gate of the selection MOS M2 of each pixel is connected to row selection lines $SEL_1$ to $SEL_m$ that are extended in the horizontal direction to be disposed, respectively. These row transfer lines, row reset lines and row selection lines are connected to a vertically scanning circuit block VSR and are supplied a signal voltage based on operation timing discussed below.

In addition, the row transfer lines $TX_1$ to $TX_m$ are connected to a collective transfer line $TX_a$ via OR circuits. Thus, transfer pulses $\phi TX_1$ to $\phi TX_m$ for each row or a transfer pulse $\phi TX_a$, which is supplied to all the pixels simultaneously, is applied to the gate of the transfer MOS TX of each pixel as described below.

The row reset lines $RES_1$ to $RES_m$ are connected to a collective reset line $RES_a$ via OR circuits, respectively. Thus, reset pulses $\phi RES_1$ to $\phi RES_m$ for each row or a reset pulse $\phi RES_a$, which is supplied to all the pixels simultaneously, is applied to the gate of the reset MOS M1 of each pixel as described below.

The source of the amplification MOS M3 of each pixel is connected to vertical output lines $V_1$ to $V_n$ that are extended in the vertical direction to be disposed, respectively.

The vertical output lines $V_1$ to $V_n$ are connected to load current source $I_1$ to $I_n$ and, at the same time, connected to a vertical output line reset voltage VVR via vertical output line reset MOS M8 for resetting the vertical output lines $V_1$ to $V_n$. Moreover, the vertical output lines $V_1$ to $V_n$ are connected to offset correction signal holding capacitors CTN for temporarily holding an offset correction signal via offset correction signal transfer MOS M4 and, at the same time, connected to optical signal holding capacitors CTS for temporarily holding an optical signal via optical signal transfer MOS M5.

Connection points V1N of the offset correction signal transfer MOS M4 and the offset correction signal holding capacitors CTN and connection points V1S of the optical signal transfer MOS M5 and the optical signal holding capacitors CTS are connected to a VRCT via holding capacitor reset MOS M9 and M10, respectively, and, at the same time, connected to a differential circuit block for taking a difference between an optical signal and a noise signal via horizontal transfer MOS M6 and M7, respectively. Gates of the horizontal transfer MOS M6 and M7 are connected to column selection lines $H_1$ to $H_n$, which are connected to a horizontally scanning circuit block HSR.

Terminals of the offset correction signal holding capacitors CTN that are not connected to the connection points V1N and terminals of the optical signal holding capacitor CTN that are not connected to the connection points V1S are grounded.

In addition, the gates of the vertical signal line reset MOS M8, the offset correction signal transfer MOS M4 and the optical signal transfer MOS M5, which are connected for each column, are commonly connected to a VRES, a TN and a TS, respectively, and are applied pulses φVRES, φTN and φTS, respectively, based on operation timing discussed below.

Figure 4:
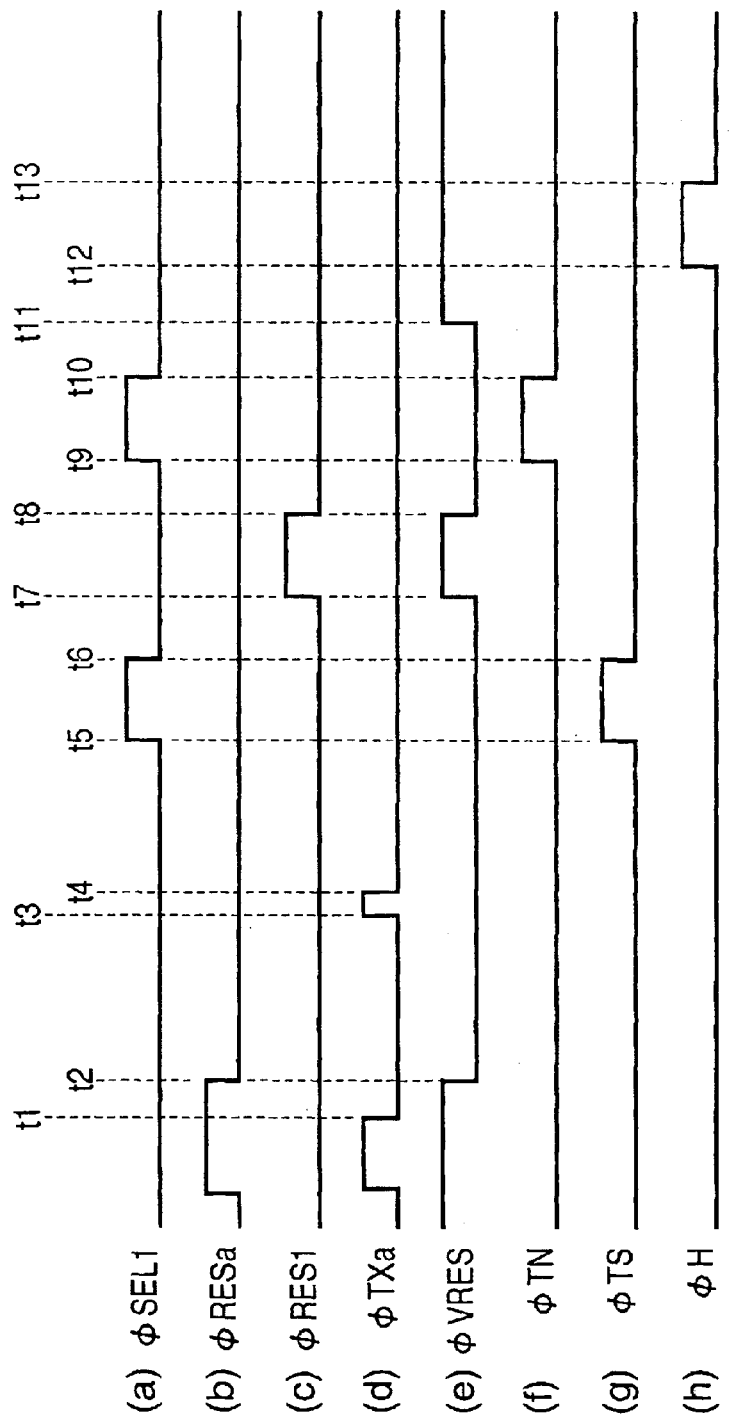
FIG. 4 is a timing chart for describing processing from accumulation of electric charges to completion of transfer data, which is performed by the solid-state image pickup element 5.

Operations of the solid-state image pickup element 5 will be described in detail with reference to FIGS. 2, 3 and 4. In this embodiment, reading-out of pixels belonging to a first row will be specifically described. In FIG. 4, reference symbol (a) denotes a row selection pulse φSEL$_1$ of the first row, (b) denotes a collective reset pulse φRES$_a$, (c) denotes a row reset pulse φRES$_1$, (d) denotes a collective transfer pulse φTX$_a$, (e) denotes a vertical output line reset pulse φVRES, (f) denotes an offset correction signal transfer pulse φTN, (g) denotes an optical signal transfer pulse φTS and (h) denotes a horizontally scanning pulse φH.

As indicated by (b) and (d) in FIG. 4, first, the collective reset pulse φRES$_a$ that is simultaneously applied to all the pixels and the collective transfer pulse φTX$_a$ that is simultaneously applied to all the pixels change to high level. In addition, as indicated by (e) in FIG. 4, it is assumed that the vertical output line reset pulse φVRES is at high level from the beginning.

Consequently, the gate of the amplification MOS M3 and the photodiode PD of each pixel are reset to a voltage VR and each vertical signal line $V_1$ to $V_n$ is reset to a voltage VVR.

Next, as indicated by (d) in FIG. 4, the collective transfer pulse φTX$_a$ changes to low level and occurrence of an electric charge according to incident light becomes possible in the photodiode PD of each pixel (t1). Subsequently, as indicated by (b) and (e) in FIG. 4, the collective reset pulse φRES$_a$ and the vertical output line reset pulse φVRES change to low level, and the reset for the gate of the reset MOS M1 of each pixel and for each vertical output line $V_1$ to $V_n$ is released (t2).

Next, as indicated by (d) in FIG. 4, after a predetermined time has elapsed from time t2, the collective transfer pulse φTX$_a$ changes to high level again to transfer electric charges accumulated in the photodiode PD of each pixel to an intra-pixel holding capacitor Cg (t3). When time sufficient for the transfer has elapsed, the collective transfer pulse φTX$_a$ changes to low level again to complete the transfer of the electric charges of the photodiode PD (t4).

Next, as indicated by (a) and (g) in FIG. 4, the row selection pulse φSEL$_1$ to be applied to the gate of the selection MOS M2 in a first row and the optical signal transfer pulse φTS to be applied to the gate of each optical signal transfer MOS M5 change to high level (t5). Consequently, an optical signal voltage of pixels in this row is read out to the optical signal holding capacitor CTS (t5 to t6).

Here, if the voltage of the intra-pixel holding capacitor Cg changes to $V_{sig}$ when the electric charges of the photodiode PD is transferred to the intra-pixel holding capacitor Cg, a voltage found by multiplying a voltage, which is $V_{sig}$ level-shifted by a voltage $V_{gs}$ between gate and source of the amplification MOS M3, by an amplification ratio A of the amplification MOS M3 is read out to the optical signal holding capacitor CTS. That is, a voltage $V_{ls}$ read out to the optical signal holding capacitor CTS is represented by the following equation.

$$V_{ls}=A(V_{sig}-V_{gs}) \quad \text{(Equation 1)}$$

Next, as indicated by (a) and (g) in FIG. 4, the row selection pulse φSEL$_1$ and the optical signal transfer pulse φTS change to low level (t6). As indicated by (c) and (e) in FIG. 4, the row reset pulse φRES$_1$ and the vertical output line reset pulse φVRES change to high level (t7) and the gate of the amplification MOS M3 and the vertical output lines $V_1$ to $V_n$ are reset (t7 to t8).

Next, the row reset pulse φRES$_1$ and the vertical output line reset pulse φVRES change to low level (t8) and, after the reset for the gate of the reset MOS M1 and for the vertical output line is released, as indicated by (a) and (f) in FIG. 4, the row selection pulse φSEL$_1$ and the offset correction signal transfer pulse φTN to be applied to the offset signal transfer MOS M4 change to high level (t9). Consequently, an offset voltage is read out to the offset correction signal holding capacitor CTN (t9 to t10). Given that the voltage read in the CTN is $V_{1N}$, $V_{1N}$ is represented by the following equation as in the above description.

$$V_{1N}=A(V_R-V_{gs}) \quad \text{(Equation 2)}$$

Thereafter, as indicated by (h) in FIG. 4, the gates of the horizontal transfer switches M6 and M7 of each column sequentially change to high level by signals φH to φH$_n$ from the horizontally scanning circuit block (t12 to t13) and voltages held in the offset correction signal holding capacitor CTN and the optical signal holding capacitor CTS are sequentially read out to the differential circuit block. In the differential circuit block, a difference between the optical signal of Equation 1 and the offset correction signal of Equation 2 is taken and sequentially outputted to an output terminal $V_{out}$. The voltage of $V_{out}$ is represented by the following equation from Equations 1 and 2.

$$V_{out}=A(V_R-V_{sig})=A \cdot V_R-A \cdot V_{sig} \quad \text{(Equation 3)}$$

In this way, the reading-out processing of the first row is completed. Thereafter, prior to reading-out of a second row, the pulse φCTR to the gates of the holding capacitor reset MOS M9 and M10 changes to high level and the offset correction signal holding capacitor CTN and the optical signal holding capacitor CTS are reset to a voltage $V_{RCT}$.

The output $V_{out}$ of the solid-state image pickup element 5 is inverted and amplified and an offset for canceling a constant $(AV_R)$ of a first term of the right side of Equation 3 is added to it, whereby only a signal proportional to $V_{sig}$ is taken out by the amplifier 6 in the next stage.

This signal is A/D converted by the A/D converter 7, whereby an A/D converted data $D_{sig}$ proportional to the optical signal $V_{sig}$ of the pixels of the solid-state image pickup element 5 is obtained.

By performing the processing as described above, the solid-state image pickup element 5 reads out an optical signal.

Figure 5:
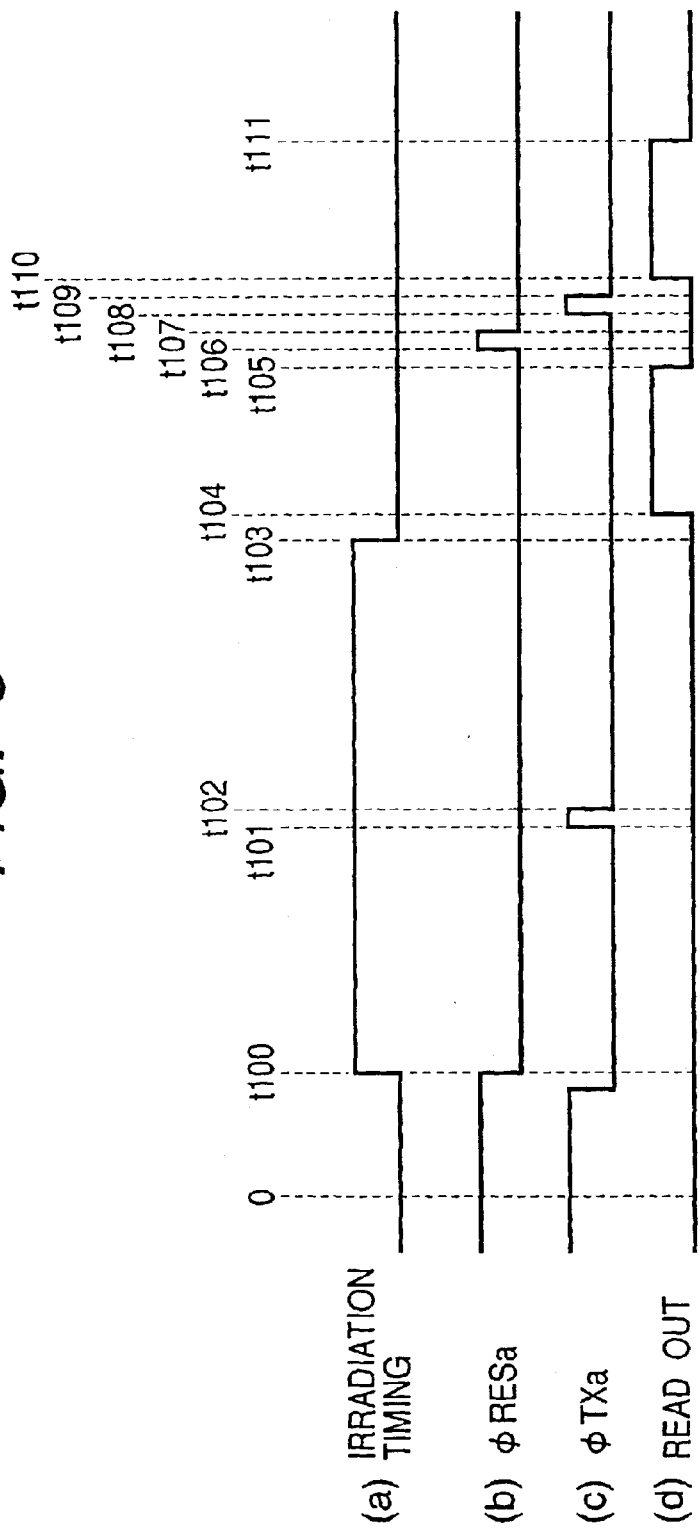
FIG. 5 is a timing chart for describing an example of processing of the present invention.

Processing performed by a radiation image pickup device of this embodiment will be hereinafter described in detail. FIG. 5 is an image pickup timing chart for describing the radiation image pickup device of this embodiment. In FIG. 5, reference symbol (a) denotes an irradiation timing of radiation, (b) denotes a pulse $\phi RES_a$ to be applied to the gate of reset MOS M1 of all the pixels simultaneously, (c) denotes a pulse $\phi TX_a$ to be applied to the gates of the transfer MOS TX of all the pixels simultaneously and (d) indicates reading-out timing for reading out image data to the amplifier 6 from the pixels.

When an X-ray generator 1 starts irradiation of X-rays as indicated by (a) in FIG. 5, the CPU 10 receives a signal for starting irradiation of X-rays irradiated by the X-ray generator 1 and drives a timing signal generator 11. The timing signal generator 11 changes the generated collective transfer pulse $\phi TX_a$ to be applied to the gates of TX of all the pixels from high level to low level and, then, changes the collective reset pulse $\phi RES_a$ to be applied to the transfer MOS M1 of all the pixels from high level to low level. Consequently, accumulation of electric charges is started in the photodiode PD (to t100).

After a predetermined time has elapsed from the accumulation starting time, as indicated by (c) in FIG. 5, the $\phi TX_a$ is changed to high level in a period from t101 to t102 and the electric charges accumulated in the photodiode PD are transferred to the intra-pixel holding capacity Cg (t101 to t102).

Here, t102 is a value set such that, when it is assumed that an irradiation time of X-rays is t100 to t103, an equation t102−t100=(t100−t103)/2 is established. The CPU 10 calculates the value based on information on the irradiation time received from the X-ray generator 1 and hands it to the timing generator 11. At this point, a voltage $V_a$ of Cg in which transferred electric charges are accumulated is represented by the following equation.

$$V_a = V_{sig1} + V_{sp1} \quad \text{(Equation 4)}$$

where, reference symbol $V_{sig1}$ denotes a signal voltage by light in a period up to t102 and $V_{sp1}$ denotes a voltage found by adding a spike noise in Cg in a period from t100 to t103 to a spike noise generated in the photodiode PD.

Next, given that A/D converted data of $V_a$ is $D_a$, $$D_a = D_{sig1} + D_{sp1} \quad \text{(Equation 5)}$$

where, $D_{sig1}$ and $D_{sp1}$ represent A/D converted data corresponding to $V_{sig1}$ and $V_{sp1}$, respectively.

Next, although $\phi TX_a$ changes to low level (t102) as indicated by (b) in FIG. 5 and the photodiode PD continues to accumulate electric charges, the transferred electric charges are held in the intra-pixel holding capacitor Cg and the above-mentioned voltage $V_a$ is maintained. As indicated by (a) in FIG. 5, irradiation of X-rays ends at time t103 (t103) and, after a predetermined time has elapsed, the signals of all the pixels are read out to the frame memory 8 as indicated by (d) in FIG. 5 (t104 to t105).

After changing the reset signal $\phi RES_a$ of the pixels to high level again as indicated by (b) in FIG. 5 to reset the electric charges in the intra-pixel holding capacitor Cg (t106 to t107), $\phi TX_a$ is changed to high level as indicated by (c) in FIG. 5 (t108 to t109) and the electric charges accumulated in the photodiode PD in the period from t102 to t103 are transferred to the intra-pixel holding capacitor Cg.

A voltage $V_b$ in the intra-pixel holding capacitor Cg to which the electric charges are transferred is represented by the following equation.

$$V_b = V_{sig2} + V_{sp2} \quad \text{(Equation 6)}$$

where, reference symbol $V_{sig2}$ denotes a signal voltage by visible light in a period from t102 to t103 and $V_{sp2}$ denotes a voltage by a spike noise in the photodiode PD.

Next, as indicated by (d) in FIG. 5, the signals of all the pixels in a period from t110 to t11 are read out to the frame memory 9. At this point, given that A/D converted data of $V_b$ is $D_b$, $$D_b = D_{sig2} + D_{sp2} \quad \text{(Equation 7)}$$

where, reference symbols $D_{sig2}$ and $D_{sp2}$ represent A/D converted data corresponding to $V_{sig2}$ and $V_{sp2}$, respectively.

A difference between Equation 5 and Equation 7 indicating data obtained by reading out the signals twice is calculated by the following equation.

$$D_a - D_b = (D_{sig1} - D_{sig2}) + (D_{sp1} - D_{sp2}) \quad \text{(Equation 8)}$$

where, since t102=t103/2, $D_{sig1}$ can be regarded as $D_{sig2}$. Therefore, the above equation is changed to the following equation.

$$D_a - D_b = D_{sp1} - D_{sp2} \quad \text{(Equation 9)}$$

In general, a frequency of generation of a spike noise is small because X-rays reaching the solid-state image pickup element 5 is reduced by the optical fiber bundle 4. Under such a condition, if a spike noise has been generated in a certain pixel, the spike noise has been generated either at the period from t100 to t102 or at the period from t102 to t103. It is less likely that it has been generated in both the periods.

Therefore, if attention is paid to a certain pixel, a result of Equation 9 is any one of the following.

$D_a - D_b = D_{sp1}$ (in the case in which a spike noise has been generated in the period from t100 to t102 and has not been generated in the period from t102 to t103)

$D_a - D_b = -D_{sp2}$ (in the case in which a spike noise has not been generated in the period from t100 to t102 and has been generated in the period from t102 to t103)

$D_a - D_b = 0$ (in the case in which a spike noise has not been generated in both the period) (Equation 10)

Since a spike noise is a noise that is generated by X-rays directly colliding with the solid-state image pickup element 5, $D_{sp1} > 0$, and $D_{sp2} > 0$ are given. In addition, a spike noise is only generated in the period from t100 to t102 or the period from t102 to t103. Therefore, if an absolute value is taken in Equation 9 or Equation 10, a value of a spike noise generated in the period from t100 to t103 of the pixel can be extracted. That is, $$|D_a - D_b| = D_{sp1} + D_{sp2} \quad \text{(Equation 11)}$$

On the other hand, since a sum of Equation 5 and Equation 7 is a sum of signal data by visible light and a spike noise in the period from t100 to t103, if the spike noise extracted by Equation 11 is deducted from the sum, only the signal data can be obtained. That is, the following equation is established.

$$D_a + D_b - |D_a - D_b| = D_{sig1} + D_{sig2} \quad \text{(Equation 12)}$$

Thus, in order to remove the spike noise, it is sufficient for the CPU 11 to execute the calculation of Equation 12 only.

Figure 6:
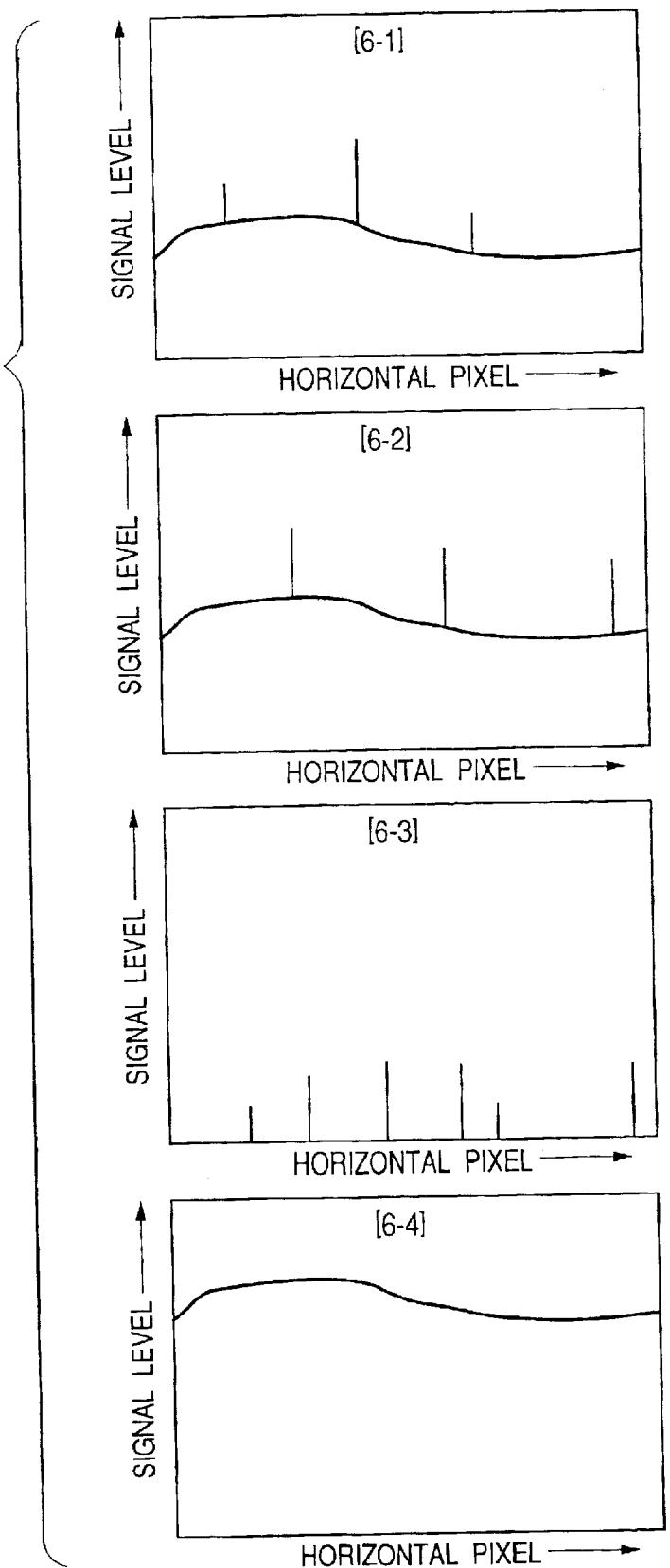
FIG. 6 shows graphs for describing an example of processing for removing a noise of the present invention.

FIG. 6 shows the above-mentioned operations by a pixel signal of a certain row. In FIG. 6, (6-1) indicates $D_a$, (6-2) indicates $D_b$, (6-3) indicates the spike noise extracted by Equation 10, and (6-4) indicates a signal obtained by removing the spike noise of (6-3) from the signal found by adding (6-1) and (6-2) by Equation 12.

Further, in Equation 12,
if $D_a-D_b>0$, the spike noise is superimposed on $D_a$ according to Equation 10. In this case, Equation 12 is changed to the following equation and $D_b$ without a spike noise is employed.

$$D_a+D_b-|D_a-D_b|D_a-D_b-(D_a-D_b)=2D_b \quad \text{(Equation 13)}$$

If $D_a-D_b<0$, the spike noise is superimposed on $D_b$ according to Equation 10. In this case, Equation 12 is changed to the following equation and $D_a$ is employed.

$$D_a+D_b-|D_a-D_b|=D_a+D_b+(D_a-D_b)=2D_a \quad \text{(Equation 14)}$$

That is, when Equation 12 is executed, data in which a noise due to X-rays is removed based on an extracted noise component, is created.

In the above-mentioned processing, image data is not required to be deleted in order to employ data of a screen without a spike noise among data for two screens. In addition, since special determination, correction based on neighboring pixels and the like are not performed, a spike noise can be removed by simple processing.

FIG. 7 shows a flow chart in which the above-mentioned processing is arranged. When X-rays irradiation is started (step S1), accumulation of electric charges is started (step S2), and the electric charges are transferred to the intra-pixel holding capacitor Cg at the point when a half of total irradiation time of X-rays has elapsed (step S3).

When the irradiation of X-rays is completed (step S4), data transferred to the intra-pixel holding capacitor Cg is read out to a differential circuit (step S5) and the intra-pixel holding capacitor Cg is reset (step S6). Next, second operation transferring electric charges to the intra-pixel holding capacitor Cg is performed (step S7) and a secondary transferred data is read out to the differential circuit (step S8). Calculation of equation 12 is performed on each pixel (step S9) and an image is made and displayed based on the obtained data (step S10).

Although the solid-state image pickup element of this embodiment is a CMOS-type sensor, if a vertical transfer CCD is used as the intra-pixel holding capacitor Cg even in the case in which a CCD is utilized, entirely the same device can be realized. Timing in this case is substantially the same as that in FIG. 1. However, when the CCD is utilized, since all electric charges of horizontal and vertical transfer CCDs are discharged by reading transfer data for the first time, it is not necessary to perform resetting the CCD in t106 to t107 in FIG. 1 before reading out data for the second time.

As described above, according to this embodiment, since a spike noise can be removed without deleting incident image data, image information to be outputted becomes more accurate. In addition, since complicated determination and correction using neighboring pixel data are not required, a device or calculation procedures can be simplified and high-speed operations becomes possible.

Although the description is made concerning photographing of a still image in the above-mentioned embodiment, the noise correction (correction of a pulse noise of X-rays) described above can also be applied to photographing of a moving image.

That is, an image of one frame is generated by images of two fields (a first field is a signal obtained in 6-1 of FIG. 6 and a second field is a signal obtained in 6-2 of FIG. 6) and such an operation is continuously performed, whereby it becomes possible to obtain a moving image.

Thus, it is seen that an image pickup device is provided. One skilled in the art will appreciate that the present invention can be practiced by other than the preferred embodiment which is presented for the purposes of illustration and not of limitation, and the present invention can be modified in any way within the technical thoughts of the present invention.

What is claimed is:

1. An image pickup device comprising:
    a photoelectric conversion region;
    a driving circuit for reading out a signal generated by photoelectric conversion from an identical pixel contained in said photoelectric conversion region for a plurality of times; and
    a correction circuit for extracting a noise component by calculating a difference among a plurality of signals read out by said driving circuit and removing said noise component contained in the signals from said pixel using said extracted noise component.

2. An image pickup device according to claim 1 further comprising a converting member for converting radiation transmitted through an object to light,
    wherein said photoelectric conversion region converts light from said converting member to an electric signal.

3. An image pickup device according to claim 2, wherein said noise component includes a noise generated by radiation transmitted through said converting member to reach said photoelectric conversion region.

4. An image pickup device according to claim 1, 2 or 3, wherein said correction circuit adds up the plurality of signals read out by said driving circuit to remove said noise component from the added up signals.

5. An image pickup device comprising:
    a converting member for converting radiation transmitted through an object to light;
    a photoelectric conversion region for converting the light converted by said converting member to an electric signal; and
    a correction circuit for extracting a noise component generated by said radiation transmitted through said converting member to reach said photoelectric conversion region from a signal outputted by a first pixel contained in said photoelectric conversion region to remove said noise component contained in the signal from said first pixel using said extracted noise component.

6. An image pickup device according to claim 2, wherein said radiation is X-rays.

7. An image pickup device according to claim 3, wherein said radiation is X-rays.

8. An image pickup device according to claim 4, wherein said radiation is X-rays.

9. An image pickup device according to claim 5, wherein said radiation is X-rays.

* * * * *

UNITED STATES PATENT AND TRADEMARK OFFICE
CERTIFICATE OF CORRECTION

PATENT NO. : 6,731,720 B2
DATED : May 4, 2004
INVENTOR(S) : Makoto Matsuura

It is certified that error appears in the above-identified patent and that said Letters Patent is hereby corrected as shown below:

Column 5,
Line 62, "Consequently," should read -- ¶ Consequently, --.

Column 8,
Line 2, "till" should read -- t111 --.

Column 9,
Line 7, "$|D_a-D_b|D_a-D_b$" should read -- $|D_a-D_b|=D_a-D_b$ --.

Signed and Sealed this

Twenty-third Day of November, 2004

JON W. DUDAS
*Director of the United States Patent and Trademark Office*